(12) United States Patent
Dong (10) Patent No.: US 11,894,927 B2
(45) Date of Patent: Feb. 6, 2024

(54) DATA TRANSMISSION METHOD AND DEVICE, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 219 days.

(21) Appl. No.: 17/500,846

(22) Filed: Oct. 13, 2021

(65) Prior Publication Data

US 2022/0045786 A1   Feb. 10, 2022

Related U.S. Application Data

(63) Continuation of application No. PCT/CN2019/083312, filed on Apr. 18, 2019.

(51) Int. Cl.
*H04L 1/00* (2006.01)
*H04L 1/1812* (2023.01)
*H04L 5/00* (2006.01)

(52) U.S. Cl.
CPC .......... *H04L 1/0057* (2013.01); *H04L 1/0003* (2013.01); *H04L 1/1812* (2013.01); *H04L 5/0055* (2013.01)

(58) Field of Classification Search
CPC ... H04L 1/0057; H04L 1/0003; H04L 1/1812; H04L 5/0055
See application file for complete search history.

(56) References Cited

U.S. PATENT DOCUMENTS

| | | | | |
|---|---|---|---|---|
| 7,599,377 B2 * | 10/2009 | Jordan | ................ | H04L 12/4633 370/400 |
| 7,835,344 B1 * | 11/2010 | Bartholomew | ..... | H04L 12/6418 370/352 |
| 8,451,910 B1 | 5/2013 | Lohier et al. | | |
| 9,681,196 B2 * | 6/2017 | Mountain | .......... | H04N 21/4385 |
| 9,826,336 B2 | 11/2017 | Seok | | |

(Continued)

FOREIGN PATENT DOCUMENTS

CN    104993847 A    10/2015
CN    105917597 A    8/2016
(Continued)

OTHER PUBLICATIONS

International Search Report and Written Opinion in the International Application No. PCT/CN2019/083312, dated Jan. 14, 2020, (7p).

(Continued)

*Primary Examiner* — Guy J Lamarre
(74) *Attorney, Agent, or Firm* — Arch & Lake LLP (57) ABSTRACT

A data transmission method and device are provided. The method includes: generating a first physical layer protocol data frame, where the first physical layer protocol data frame includes a first identification bit and a second identification bit, the first identification bit is used for identifying whether the first physical layer protocol data frame is a retransmission data frame, and the second identification bit is used for identifying the number of retransmissions of the first physical cal layer protocol data frame; and sending the first physical layer protocol data frame.

20 Claims, 5 Drawing Sheets

(56) References Cited

U.S. PATENT DOCUMENTS

| | | | |
|---|---|---|---|
| 10,111,226 B2* | 10/2018 | Barriac | H04W 72/0453 |
| 10,511,502 B2* | 12/2019 | Ikuta | H04L 69/22 |
| 2004/0085931 A1* | 5/2004 | Rezaiifar | H04W 36/0066 |
| | | | 370/331 |
| 2009/0106636 A1* | 4/2009 | Jenkins | H04L 1/1874 |
| | | | 714/E11.053 |
| 2011/0132424 A1* | 6/2011 | Rakib | H02J 3/381 |
| | | | 136/244 |
| 2016/0337783 A1 | 11/2016 | Seok | |
| 2017/0238286 A1 | 8/2017 | Chun et al. | |
| 2017/0303159 A1 | 10/2017 | Ma et al. | |
| 2018/0139699 A1 | 5/2018 | Choi et al. | |
| 2019/0223197 A1 | 7/2019 | Shin et al. | |
| 2019/0274062 A1 | 9/2019 | Ma et al. | |
| 2019/0319889 A1 | 10/2019 | Zhang et al. | |
| 2019/0349782 A1 | 11/2019 | Kim et al. | |

FOREIGN PATENT DOCUMENTS

| | | |
|---|---|---|
| CN | 106712907 A | 5/2017 |
| CN | 108075867 A | 5/2018 |
| CN | 108270682 A | 7/2018 |
| CN | 108664444 A | 10/2018 |
| CN | 109644480 A | 4/2019 |
| WO | 2016057482 A1 | 4/2016 |
| WO | 2018009045 A1 | 1/2018 |

OTHER PUBLICATIONS

Supplementary European Search Report issued in the European Application No. 19924874.1, dated Oct. 28, 2022. (7p).

* cited by examiner

FIG. 1

| B0 B1 | B2 B3 B4 | B7 | B8 | B9 | B10 | B11 | B12 | B13 | B14 | B15 |
|---|---|---|---|---|---|---|---|---|---|---|
| Protocol Version | Type | Subtype | To destination address (To DS) | From destination address (From DS) | More Fragments | Retry | Power management | More data | Protected Frame | +HTC |
| Bits 2 | 2 | 4 | 1 | 1 | 1 | 1 | 1 | 1 | 1 | 1 |

FIG. 2

| L-LTF/STF | L-SIG | SIG/HARO |
|---|---|---|

FIG. 3

| Preset PER threshold (threshold) | UP | Retry threshold |
|---|---|---|
| PER consistency | BK | m |
| | BE | n |
| | VI | k |
| | VO | l |

FIG. 4

| Preset PER threshold (threshold) | UP | Retry threshold |
|---|---|---|
| 15% | BK | m |
| 10% | BE | n |
| 8% | VI | k |
| 5% | VO | l |

DATA TRANSMISSION METHOD AND DEVICE, AND STORAGE MEDIUM

CROSS-REFERENCE TO RELATED APPLICATION

This application is a continuation application of PCT International Application No. PCT/CN2019/083312, filed on Apr. 18, 2019, the contents of which are hereby incorporated by reference in their entirety for all purposes.

TECHNICAL FIELD

The present disclosure relates to the technical field of wireless communications, and more particularly, to a method and device for data transmission, and a storage medium.

BACKGROUND

In wireless communications, an Acknowledgement (ACK) mechanism or a Block Acknowledgement (Block ACK) mechanism is adopted for whether a data frame is received correctly, i.e., a bit is used to identify whether the data frame is received correctly. If the data frame is not correctly received, the data is retried by using an Automatic Repeat-reQuest (ARQ) mechanism.

SUMMARY

The present disclosure provides a method and device for data transmission, and a storage medium.

According to a first aspect of the present disclosure, a method for data transmission is provided. The method includes that a first physical layer protocol data frame is generated, where the first physical layer protocol data frame includes a first identification bit and a second identification bit, the first identification bit is configured to identify whether the first physical layer protocol data frame is a retry data frame, and the second identification bit is configured to identify the number of retries of the first physical layer protocol data frame.

Furthermore, the method includes that the first physical layer protocol data frame is transmitted.

According to a second aspect of the present disclosure, a device for data transmission is provided. The device includes a processor and a non-transitory storage coupled to the processor. A plurality of programs stored in the non-transitory storage, when executed by the processor, cause the device to: generate a first physical layer protocol data frame, where the first physical layer protocol data frame includes a first identification bit and a second identification bit, the first identification bit is configured to identify whether the first physical layer protocol data frame is a retry data frame, and the second identification bit is configured to identify a number of retries of the first physical layer protocol data frame. Furthermore, the plurality of programs cause the device to transmit the first physical layer protocol data frame.

According to a third aspect of the disclosure, a storage medium is provided. The storage medium stores an executable program, and the executable program is executed by a processor to implement the method for data transmission according to the first aspect.

It is to be understood that the above general descriptions and detailed descriptions below are only exemplary and explanatory and not intended to limit the embodiments of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of example do not represent all implementations consistent with the embodiments of the disclosure. Instead, they are merely examples of devices and methods consistent with aspects related to the embodiments of the disclosure as recited in the appended claims.

Terms used in the embodiments of the disclosure are only adopted for the purpose of describing specific embodiments and not intended to limit the embodiments of the disclosure. "A/an", "said" and "the" in a singular form in the embodiments of the disclosure and the appended claims are also intended to include a plural form, unless other meanings are clearly denoted throughout the disclosure. It is also to be understood that term "and/or" used in the disclosure refers to and includes any or all possible combinations of one item or multiple associated items that is/are listed.

It is to be understood that, although terms first, second, third and the like may be adopted to describe various information in the embodiments of the disclosure, the information should not be limited to these terms. These terms are only adopted to distinguish the information of the same type. For example, without departing from the scope of the embodiments of the disclosure, first information may also be called second information and, and similarly, second information may also be called first information. For example, the term "if" used here may be explained as "while" or "when" or "responsive to determining", which depends on the context.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Perform entity related in the embodiments of disclosure includes, but are not limited to, network equipment under a wireless communication network, especially a Wi-Fi network, such as an 802.11 a/b/g/n/ac standard, and under an 802.11be standard in a next generation Wi-Fi network, and the network equipment includes, but is not limited to, wireless access point equipment such as a Wi-Fi router, a user terminal, a user node, a mobile terminal or a tablet computer.

The application scenario of the embodiments of the disclosure: when transmitting-side network equipment transmits a physical layer protocol data frame to receiving-side network equipment, physical layer protocol data is not successfully received by opposite-end equipment due to influences such as a communication environment (including poor communication environment or communication collision), and thus a retry is needed. Retry in related technologies may cause the problems of low effective utilization rate of frequency spectrum and low throughput of the whole network.

Figure 1:
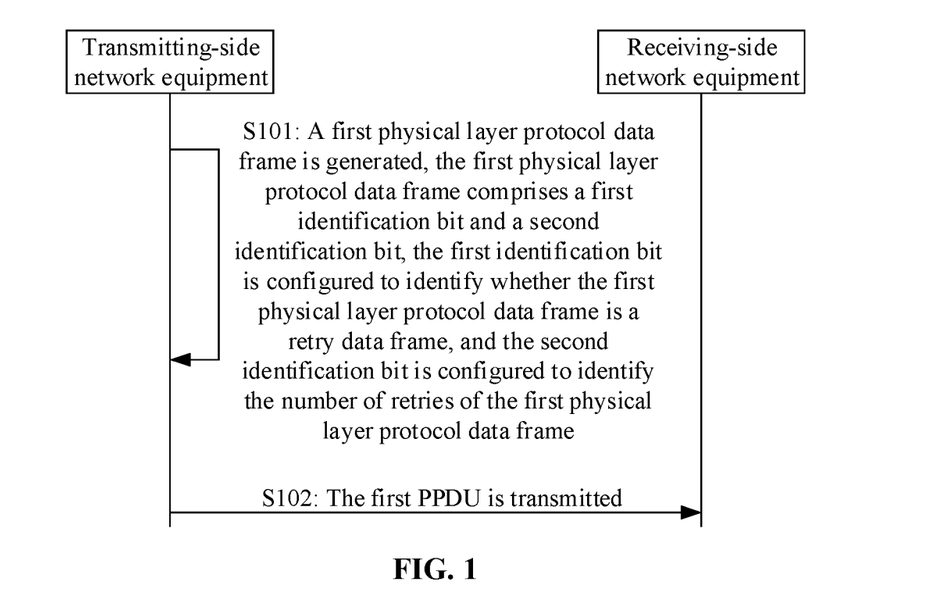
FIG. 1 is a flowchart showing a method for data transmission according to an example.

As shown in FIG. 1, the example provides a method for data transmission, which may be used in wireless communication equipment such as a terminal, and includes the following operations.

In S101, a first physical layer protocol data frame is generated, the first physical layer protocol data frame includes a first identification bit and a second identification bit, the first identification bit is configured to identify whether the first physical layer protocol data frame is a retry data frame, and the second identification bit is configured to identify the number of retries of the first physical layer protocol data frame.

In S102, the first physical layer protocol data frame is transmitted.

In the process of generating the first physical layer protocol data frame from original to-be-transmitted data information by the transmitting-side network equipment, the first identification bit and the second identification bit may be added in a mode of setting a frame header.

The first identification bit may identify the first physical layer protocol data frame as an initial transmission or a retry with two different state values respectively.

Figure 2:
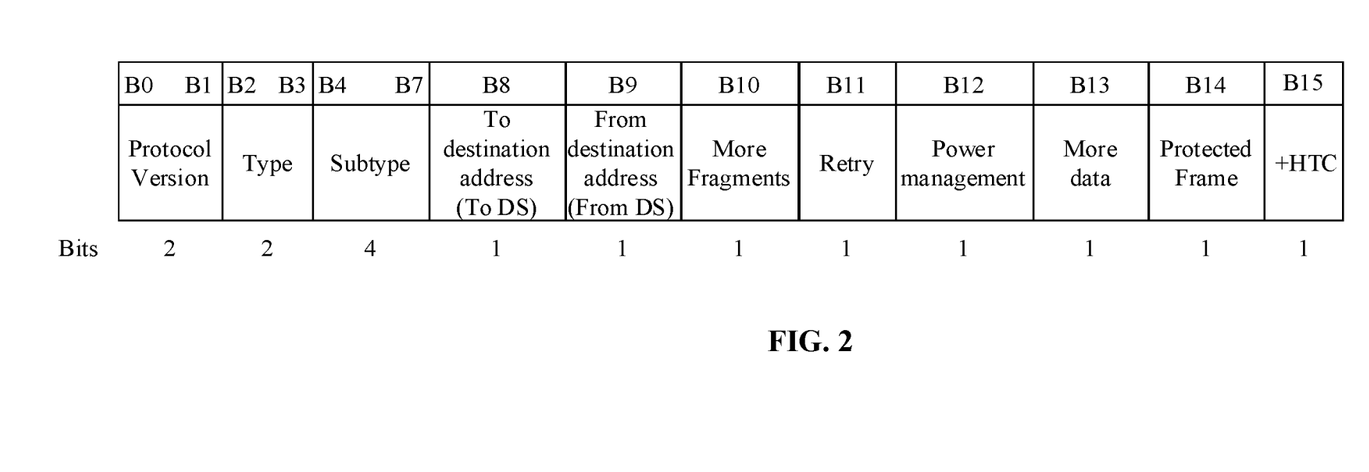
FIG. 2 is a block diagram showing a Media Access Control (MAC) frame header structure of a first physical layer protocol data frame according to an example.

For example, as shown in FIG. 2, an MAC header structure of a first physical layer protocol data frame according to the embodiment of the disclosure is exemplarily provided. the position of B11 is the first identification bit, defined as retry, occupying 1 bit. In FIG. 2, +HTC represents High-Throughput Control.

For another example, by taking the MAC frame header structure shown in FIG. 2 as an example, when the transmitting-side network equipment transmits the first physical layer protocol data frame for the first time, the retry in the first identification bit is "0"; the retry being 0 indicates that the first physical layer protocol data frame is non-retry data transmitted for the first time, and the second identification bit being initially "0" indicates that the number of retries of the first physical layer protocol data frame is 0 or no retry occurs. When the first physical layer protocol data frame transmitted by the transmitting-side network equipment for the first time is not successfully received by receiving-side network equipment and the first physical layer protocol data frame is retried, the first identification bit is set to be "1", and it is indicated that the current first physical layer protocol data frame is a retry data frame; and at the same time, the second identification bit starts counting and records the number of retries as 1. The receiving-side network equipment may send ACK data identification to the transmitting-side network equipment for feeding back that the first physical layer protocol data frame is not successfully received. Here, successful reception of the physical layer protocol data frame refers to successful demodulation, parsing, decoding, or the like for the physical layer protocol data frame.

The first identification bit is adopted for identifying initial transmission and retry, the second identification bit is adopted for identifying the number of retries, when the first identification bit is in a retry state, retries may be counted, the number of retries is stored in the second identification bit, and therefore, a reliable counting for the number of retries is provided. On one hand, receiving-side network equipment may determine how many times the currently received data frame is retried according to the number of retries carried by the physical layer protocol data frame, and on the other hand, a relatively reliable comparison value is provided for subsequent processing such as comparison with the preset retry threshold.

In some embodiments, the first physical layer protocol data frame further includes a third identification bit, which is configured to identify a first Modulation and Coding Scheme (MCS) adopted by the first physical layer protocol data frame.

The MCS defines an adjustment and coding scheme of the physical layer protocol data frame, and different MCSs correspond to different transmission rates of the physical layer protocol data frame and different MCSs have different adaptations to the communication environment. It is generally considered that MCS with a low rate has a low requirement for the communication environment.

The transmitting-side network equipment generates the first physical layer protocol data frame by adopting the first MCS, and sets the identification information of the adopted first MCS in the third identification bit. The identification information of the first MCS may be determined by pre-negotiation between the transmitting-side network equipment and the receiving-side network equipment, and different identification information is adopted to identify different MCSs. For example, the MCS corresponding to the identification information may be queried in a look-up table mode.

In some embodiments, the second identification bit includes at least one bit in a physical frame header of the first physical layer protocol data frame, and/or the third identification bit includes at least one bit in the physical frame header of the first physical layer protocol data frame.

The second identification bit and the third identification bit may be defined in the physical frame header of the first physical layer protocol data frame; and the second identification bit and the third identification bit are set in the physical frame header, so that the first physical layer protocol data frame is conveniently packaged in the physical layer, and the packaging complexity is reduced.

The number of bits included in the second identification bit may be defined according to the maximum number of retries and the like. For example, 4 bits may be adopted to represent the number of retries. For example, "0011" represents that the first physical layer protocol data frame is retried for 3 times, and the maximum number of retries which may be identified is 16 times.

The number of bits included in the third identification bit may be defined according to the number of different MCS which may be adopted, for example, 4 bits may be adopted to identify 16 MCSs.

In some embodiments, the at least one bit of the second identification bit is located in a signal domain of the physical frame header of the first physical layer protocol data frame.

In some embodiments, the at least one bit of the third identification bit is located in the signal domain of the physical frame header of the first physical layer protocol data frame.

Figure 3:
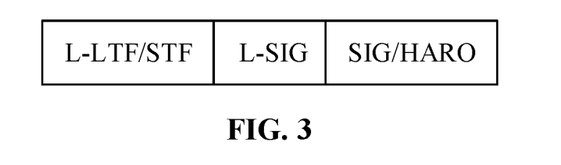
FIG. 3 is a block diagram showing a physical frame header structure of a first physical layer protocol data frame according to an example.

As shown in FIG. 3, a signal domain of a frame header of a first physical layer protocol data frame according to an embodiment of the disclosure is exemplarily provided, and the signal domain may be denoted by SIG.

In some embodiments, when the number of retries reaches a preset retry threshold, the third identification bit is configured to identify a second MCS adopted by the first physical layer protocol data frame.

The preset retry threshold may be a natural number other than 0. If the preset retry threshold is 0, it is indicated that retry does not occur.

When the number of retries of the first physical layer protocol data frame retried by the transmitting-side network equipment reaches the preset retry threshold, the first physical layer protocol data frame may be generated by adopting the second MCS, the identification information of the second MCS is set in the third identification bit, and the first physical layer protocol data frame generated by adopting the second MCS is transmitted again.

In some embodiments, the rate corresponding to the second MCS is lower than the rate corresponding to the first MCS.

The second MCS may add more redundant information to ensure that the receiving-side network equipment may correctly demodulate the signal, and the more redundant information means a relatively low coding rate, so that the rate of the second MCS is lower than the rate corresponding to the first MCS, but may adapt to poor channel quality. The transmitting-side network equipment generates the first physical layer protocol data frame by adopting the second MCS corresponding to a relatively lower rate, so that the first physical layer protocol data frame has better adaptability to a communication environment in a transmission process. For example, transmission may be completed under the condition of poor channel quality, therefore, the receiving-side network equipment may successfully receive the first physical layer protocol data frame, so that the condition of receiving failure caused by adopting the same MCS for retry is reduced, the receiving success rate of the retry data frame is improved, and the spectrum utilization rate and the network throughput are improved.

In some embodiments, when the first identification bit identifies the first physical layer protocol data frame as a retry data frame, the second identification bit is adopted to identify the number of retries of the first physical layer protocol data frame, and/or the third identification bit is adopted to identify the MCS adopted by the first physical layer protocol data frame.

Taking the MAC frame header structure shown in FIG. 2 as an example, when a retry bit is set to be 1, it is indicated that when the first physical layer protocol data frame is a retry data frame, the second identification bit and the third identification bit are set, the second identification bit adds 1 to the previous counting, and the identification information of the MCS of the third identification bit is set according to the MCS adopted by the current first physical layer protocol data frame.

In some embodiments, when the retry bit is set to "0", it is indicated that the first physical layer protocol data frame is a transmission data frame, and the second identification bit and the third identification bit are not set in the data frame.

If the identification information of the MCS of the third identification bit is different from that of the previous transmission, it is indicated the number of retries of the first physical layer protocol data frame reaches the preset retry threshold.

In some embodiments, a second physical layer protocol data frame is generated, the second physical layer protocol data frame includes a fourth identification bit, and the fourth identification bit is configured to identify the MCS, of the first physical layer protocol data frame which is successfully received, adopted by the second physical layer protocol data frame.

The second physical layer protocol data frame is a physical layer protocol data frame generated after the first physical layer protocol data frame is transmitted and received successfully. The first physical layer protocol data frame and the second physical layer protocol data frame may adopt the same frame structure. The fourth identification bit may be set the same as the third identification bit.

After the first physical layer protocol data frame is successfully received by the receiving-side network equipment, the transmitting-side network equipment may generate the second physical layer protocol data frame by adopting the MCS identified by the third identification bit of the first physical layer protocol data frame, and the adopted MCS is identified at the fourth identification bit.

The first physical layer protocol data frame is successfully received by the receiving-side network equipment, it is indicated that the adjustment and coding strategy of the MCS adopted by the current first physical layer protocol data frame may adapt to communication environments such as current channel quality, and the receiving success rate of the receiving side network equipment for the physical layer protocol data frame may be improved by adopting the MCS. Therefore, by adopting the MCS to generate the second physical layer protocol data frame, the receiving success rate of the second physical layer protocol data frame at the receiving-side network equipment may be improved. The receiving success rate refers to successful demodulation, parsing, decoding, or the like of the physical layer protocol data frame at the receiving-side network equipment.

If retry occurs in the transmitting process of the second physical layer protocol data frame, the retry may be processed in the same mode as the retry of the first physical layer protocol data frame, and no descriptions will not made here.

In some embodiments, when the number of retries reaches the preset retry threshold, and an actual error parameter of the first physical layer protocol data frame generated by adopting the first MCS exceeds a preset error parameter, the third identification bit is configured to identify the second MCS adopted by the first physical layer protocol data frame.

The error parameter may be an index for measuring transmission accuracy of the data frame; and may include Symbol Error Rate (SER), BER, PER, and the like.

Here, the actual error parameter is judged, and a more definite judgment basis may be provided for adopting the second MCS. For example, according to the actual error parameter, an MCS corresponding to the actual error parameter is selected as the second MCS.

In some embodiments, the preset retry threshold of the first physical layer protocol data frame is determined according to the data type of the first physical layer protocol data frame, and/or the preset error parameter of the first physical layer protocol data frame is determined according to the data type of the first physical layer protocol data frame.

Different preset retry thresholds and/or preset error parameters may be defined for different data types.

For example, for data types with high timeliness requirements, a low preset retry threshold may be set, and for data types with high accuracy requirements, a low preset error parameter may be set. Different preset retry thresholds and/or preset error parameters are set for different data types, so that transmission requirements of physical layer protocol data frames of different data types may be met.

In some embodiments, the data types corresponding to different UPs are different.

In the Wi-Fi standard, data types are defined corresponding to four different UPs, the four data types are respectively BacK ground (BK), Best Effort (BE), VIdeo (VI) and VOice (VO), and different UPs may be adopted to define the data types.

In some embodiments, the operation that an actual error parameter of the first physical layer protocol data frame generated by adopting the first MCS exceeds a preset error parameter includes that the PER of the first physical layer protocol data frame generated by adopting the first MCS exceeds a preset PER threshold.

In some embodiments, the operation that an actual error parameter of the first physical layer protocol data frame generated by adopting the first MCS exceeds a preset error parameter includes that the BER of the first physical layer protocol data frame generated by adopting the first MCS exceeds a preset BER threshold.

By taking an example that the data types are defined by adopting Ups and the PER is adopted as the error parameter, there are multiple ways to define the preset retry threshold and/or the preset PER threshold for different UPs and PERs, and two alternative ways are provided below.

Figure 4:
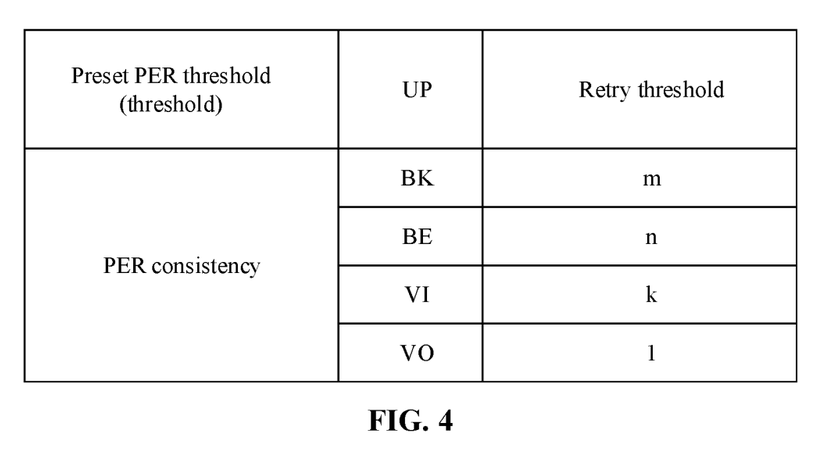
FIG. 4 is a diagram showing correspondences between the retry thresholds and preset PER thresholds according to an example.

In the first mode, as shown in FIG. 4, the same preset PER threshold and different preset retry thresholds may be adopted for physical layer protocol data frames with different UPs; and m, n, k, and l may be non-zero natural numbers, and m>n>k>l.

Figure 5:
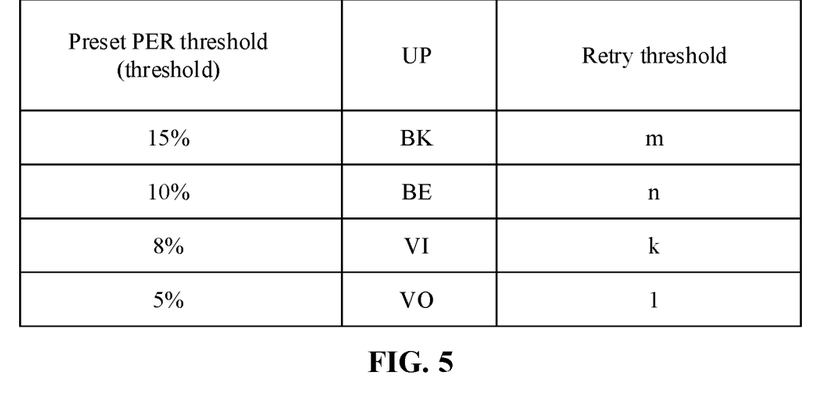
FIG. 5 is another diagram showing correspondences between retry thresholds and preset PER thresholds according to an example.

In the second mode, as shown in FIG. 5, the different preset PER thresholds and different preset retry thresholds may be adopted for physical layer protocol data frames with different UPs; and m, n, k and l may be non-zero natural numbers, and m>n>k>l.

Different preset retry thresholds and preset error parameters are adopted for different data types, so that process for different data types may be distinguished, and the invalidity and transmission data volume of physical layer protocol data frames with different data types are met.

The receiving-side network equipment receives the first physical layer protocol data frame transmitted by the transmitting-side network equipment, if the first physical layer protocol data frame is successfully received, ACK identification information indicating that the first physical layer protocol data frame is successfully received is sent to the transmitting-side network equipment, and the first physical layer protocol data frame may be parsed according to the first MCS identified by the third identification bit in the first physical layer protocol data frame. If the first physical layer protocol data frame is not successfully received, ACK identification information indicating that the first physical layer protocol data frame is not successfully received is transmitted, and the receiving-side network equipment waits for the first physical layer protocol data frame retried by the transmitting-side network equipment.

According to the method for data transmission provided by the embodiment of the disclosure, the number of retries of the physical layer protocol data frame is detected, when the number of retries exceeds the threshold, the MCS with the low transmission rate is selected for transmission again, so that the situation that the receiving success rate is low due to the fact that the single MCS is fixedly adopted for retry under the condition of poor communication environment is reduced. With the technical solution provided by the embodiment of the disclosure, the receiving success rate may be improved, and then the effective utilization rate of the frequency spectrum and the throughput of the whole network may be improved.

Several specific examples are provided below in combination with any of the embodiments described above.

Figure 6:
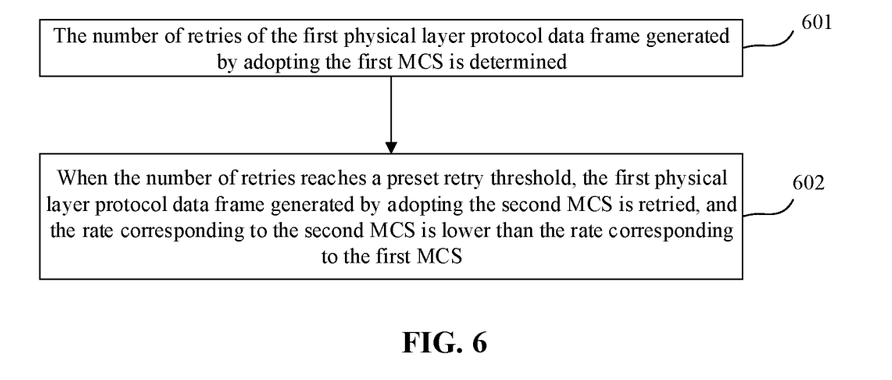
FIG. 6 is a flowchart showing a method for data transmission according to another example.

Example 1: The example provides a method for data transmission, as shown in FIG. 6, which may include the following operations.

In 601, the number of retries of the first physical layer protocol data frame generated by adopting the first MCS is determined.

In 602, when the number of retries reaches a preset retry threshold, the first physical layer protocol data frame generated by adopting the second MCS is retried, and the rate corresponding to the second MCS is lower than the rate corresponding to the first MCS.

In some embodiments, the physical frame header in the first physical layer protocol data frame includes a second identification bit, and the second identification bit carries the number of retries.

In some embodiments, the method further includes the following operations.

The second physical layer protocol data frame generated by adopting the MCS adopted by the successfully received first physical layer protocol data frame is transmitted.

In some embodiments, when the number of retries threshold reaches the preset retry threshold and the actual error parameter of the first physical layer protocol data frame generated by adopting the first MCS exceeds the preset error parameter, the first physical layer protocol data frame generated by adopting the second MCS is repeated.

In some embodiments, the method further includes the following operations.

A preset retry threshold of the first physical layer protocol data frame is determined according to the data type of the first physical layer protocol data frame, and/or the preset error parameter of the first physical layer protocol data frame is determined according to the data type of the first physical layer protocol data frame.

In some embodiments, the UPs corresponding to different data types are different.

In some embodiments, the operation that an actual error parameter of the first physical layer protocol data frame generated by adopting the first MCS exceeds a preset error parameter includes the following operation.

The PER of the first physical layer protocol data frame generated by adopting the first MCS exceeds the preset PER threshold; and/or the BER of the first physical layer protocol data frame generated by adopting the first MCS exceeds a preset BER threshold.

Example 2: The example provides a method for data transmission in which under the same MCS condition, the number of retries is recorded, if the PER exceeds a certain preset PER threshold, the MCS is reduced, but the counting continues. Specifically, the method further includes the following operation.

After the first physical layer protocol data frame of the transmitting-side network equipment has been transmitted for one time and an ACK fed back by the receiving-side network equipment is received to identify that the first physical layer protocol data frame is not correctly received, the first physical layer protocol data frame is transmitted again, the first identification bit, namely the retry domain, of the MAC frame header is set to be "1", and the MAC frame header structure may be shown as FIG. 2.

A second identification bit of the first physical layer protocol data frame may be defined on a physical frame header of the first physical layer protocol data frame, the number of retries is recorded, and the second identification bit may be defined in an SIG or HARQ retry domain, as shown in FIG. 3. Four bits may be adopted for identification, for example, "0011" indicates that the first physical layer protocol data frame has been retried for three times.

Only when the retry domain of the MAC frame header in the first physical layer protocol data frame is set to be 1, the number of retries is set correspondingly.

Under the condition that the PER is fixed, different retries are determined according to data types, and in the Wi-Fi standard, the data types correspond to four different UPs, namely BK, BE, VI and VO. For example, the maximum number of retries of the BK and the minimum number of retries of the VO may be defined. By taking an example that the data types are defined by adopting Ups and the PER is adopted as the error parameter, there are multiple ways to define the preset retry threshold and/or the preset PER threshold for different UPs and PERs, and two alternative ways are provided below.

In the first mode, as shown in FIG. 4, the same preset PER threshold and different preset retry thresholds may be adopted for first physical layer protocol data frames with different UPs; and m, n, k and l may be non-zero natural numbers, and m>n>k>l.

In the second mode, as shown in FIG. 5, the different preset PER thresholds and different preset retry thresholds may be adopted for first physical layer protocol data frames with different UPs; and m, n, k and l may be non-zero natural numbers, and m>n>k>l.

The first physical layer protocol data frame is retried again after the MCS is reduced, and the number of retries is gradually increased, so that a receiver may combine with a packet which is not completely received before, and a correct physical layer protocol data frame is decoded.

After the transmitting-side network equipment receives the ACK of the first physical layer protocol data frame fed back by the receiving-side network equipment and the ACK identifies that the first physical layer protocol data frame is successfully retried, the retry domain and a retry counter are set to be 0 when the next physical layer protocol data frame (namely the second physical layer protocol data frame) is transmitted, and the MCS adopted by the second physical layer protocol data frame is the same as the MCS adopted when the first physical layer protocol data frame is retried for the last time.

Figure 7:
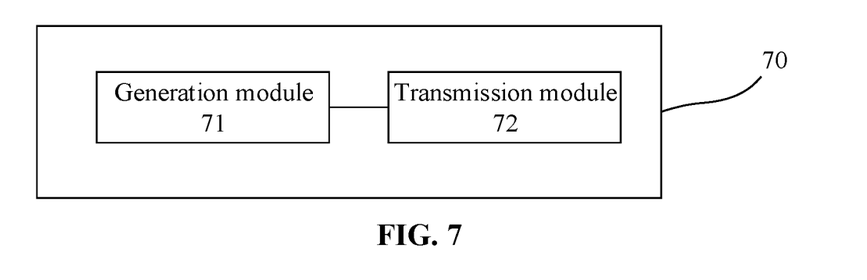
FIG. 7 is a block diagram showing a device for data transmission according to an example.
Figure 8:
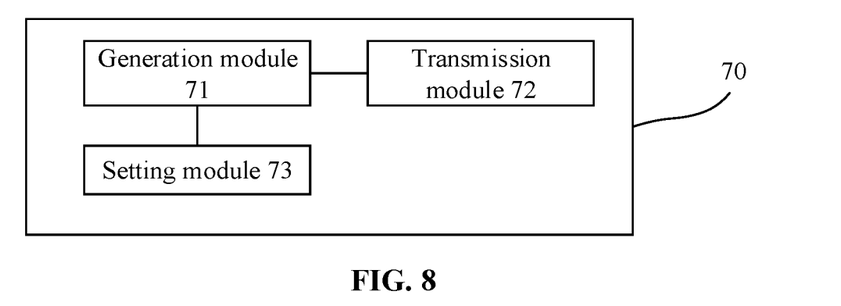
FIG. 8 is a block diagram showing a device for data transmission according to another example.

The embodiments of the disclosure further provide a device for data transmission. FIG. 7 is a schematic diagram of a composition structure of a device for data transmission according to an embodiment of the disclosure. As shown in FIG. 7, the device 70 includes a generation module 71 and a transmission module 72.

The generation module 71 is configured to generate a first physical layer protocol data frame, the first physical layer protocol data frame includes a first identification bit and a second identification bit, the first identification bit is configured to identify whether the first physical layer protocol data frame is a retry data frame, and the second identification bit is configured to identify the number of retries of the first physical layer protocol data frame.

The transmission module 72 is configured to transmit the first physical layer protocol data frame.

In some embodiments, the generation module 72 is further configured to generate a third identification bit of the first physical layer protocol data frame, and the third identification bit is configured to identify a first MCS adopted by the first physical layer protocol data frame.

In some embodiments, the second identification bit includes at least one bit in a physical frame header of the first physical layer protocol data frame, and/or the third identification bit includes at least one bit in the physical frame header of the first physical layer protocol data frame.

In some embodiments, the at least one bit of the second identification bit is located in a signal domain of the physical frame header of the first physical layer protocol data frame.

In some embodiments, the at least one bit of the third identification bit is located in the signal domain of the physical frame header of the first physical layer protocol data frame.

In some embodiments, the generation module 71 is further configured to when the number of retries reaches a preset retry threshold, the third identification bit is configured to identify a second MCS adopted by the first physical layer protocol data frame.

In some embodiments, the rate corresponding to the second MCS is lower than the rate corresponding to the first MCS.

In some embodiments, the generation module 71 is further configured to generate a second physical layer protocol data frame, the second physical layer protocol data frame includes a fourth identification bit, and the fourth identification bit is configured to identify the MCS, of the first physical layer protocol data frame which is successfully received, adopted by the second physical layer protocol data frame.

In some embodiments, the generation module 71 is further configured to when the number of retries reaches a preset retry threshold, and an actual error parameter of the first physical layer protocol data frame generated by adopting the first MCS exceeds a preset error parameter, the third identification bit is configured to identify the second MCS adopted by the first physical layer protocol data frame.

In some embodiments, as shown in FIG. 7 the device 70 further includes a setting module 73.

The setting module 73 is configured to determine the preset retry threshold of the first physical layer protocol data frame according to the data type of the first physical layer protocol data frame, and/or determine a preset error parameter of the first physical layer protocol data frame according to the data type of the first physical layer protocol data frame.

In some embodiments, the data types corresponding to different UPs are different.

In some embodiments, the generation module 71 is specifically further configured to:
when the number of retries reaches a preset retry threshold,
and the PER of the first physical layer protocol data frame generated by adopting the first MCS exceeds a preset PER threshold,
the third identification bit is configured to identify a second MCS adopted by the first physical layer protocol data frame.

In some embodiments, the generation module 71 is specifically further configured to:
when the number of retries reaches a preset retry threshold,
and the BER of the first physical layer protocol data frame generated by adopting the first MCS exceeds a preset BER threshold,
the third identification bit is configured to identify a second MCS adopted by the first physical layer protocol data frame.

In an example, the generation module 71 and the setting module 73 may be implemented by one or more of a Central Processing Unit (CPU), a Graphics Processing Unit (GPU), a baseband processor (BP), an Application Specific Integrated Circuit (ASIC), a digital signal processor (DSP), a Programmable Logic Device (PLD), a Complex Programmable Logic Device (CPLD), a Field-Programmable Gate Array (FPGA), a general purpose processor, a controller, a Micro Controller Unit (MCU), a Microprocessor, or other electronic components. The transmission module 72 is implemented by one or more radio frequency (RF) antennas for performing the aforementioned method.

Figure 9:
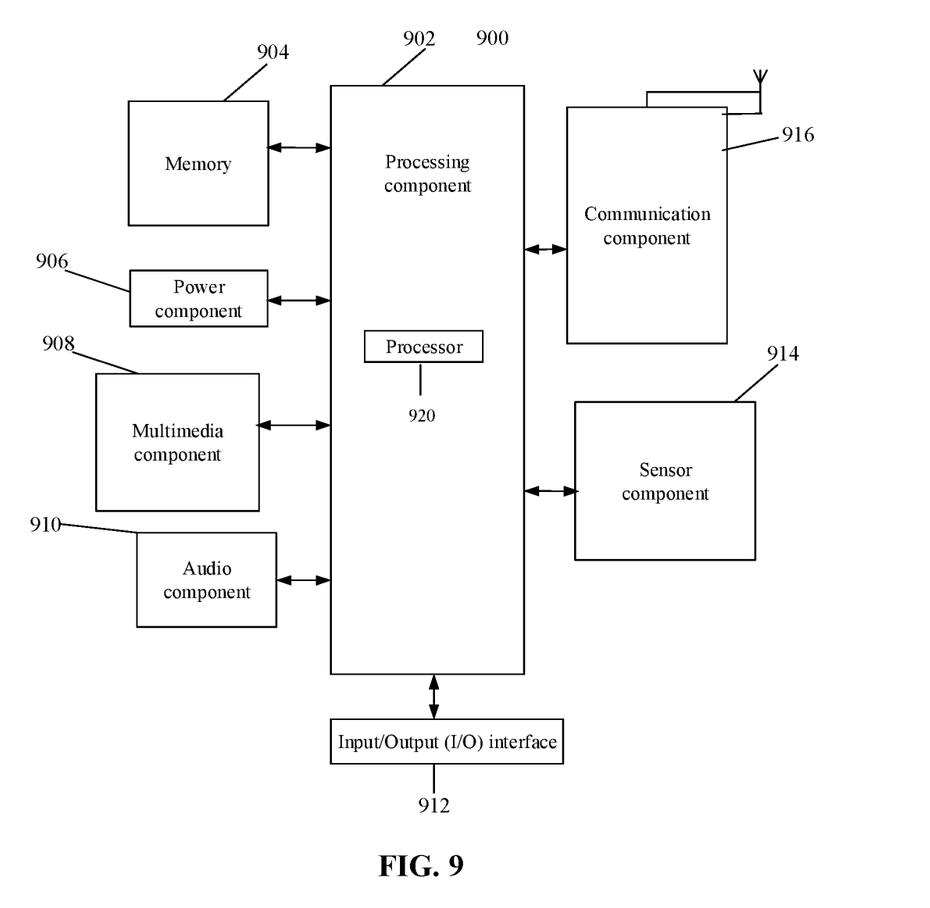
FIG. 9 is a block diagram showing a device for data transmission according to still another example.

FIG. 9 is a block diagram showing a device 900 for data transmission according to an example of the disclosure. For example, the device 900 may be a mobile phone, a computer, a digital broadcast terminal, a messaging device, a gaming console, a tablet, a medical device, exercise equipment, a Personal Digital Assistant (PDA) and the like.

Referring to FIG. 9, the device 900 may include one or more of the following components: a processing component 902, a memory 904, a power component 906, a multimedia component 908, an audio component 910, an Input/Output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above-described method. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any application or method operated on the device 900, contact data, phonebook data, messages, pictures, videos, etc. The memory 904 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive external multimedia data when the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a Microphone (MIC) configured to receive an external audio signal when the device 900 is in an operation mode, such as a call mode, a recording mode, and a voice recognition mode. The received audio signal may further be stored in the memory 904 or transmitted via the communication component 916. In some embodiments, the audio component 910 further includes a speaker configured to output audio signals.

The I/O interface 912 provides an interface between the processing component 902 and peripheral interface modules, and the peripheral interface modules may be a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900 and relative positioning of components, such as the display and the keypad of the device 900, and the sensor component 914 may further detect a change in position of the device 900 or a component of the device 900, a presence or absence of user contact with the device 900, an orientation or an acceleration/deceleration of the device 900, and a change in temperature of the device 900. The sensor component 914 may include a proximity sensor, configured to detect the presence of nearby objects without any physical contact. The sensor component 914 may also include a light sensor, such as a Complementary Metal Oxide Semiconductor (CMOS) or Charge Coupled Device (CCD) image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communications, wired or wirelessly, between the device 900 and other devices. The device 900 may access a wireless network based on a communication standard, such as Wi-Fi, 2G, 3G, 4G LTE, 5G NR or a combination thereof. In one example, the communication component 916 receives a broadcast signal or broadcast associated information from an external broadcast management system via a broadcast channel. In an example, the communication component 916 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In an example, the device 900 may be implemented with one or more Application Specific Integrated Circuits (ASIC), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an example, a non-temporary computer readable storage medium including an instruction is further provided, for example, the memory 904 including the instruction; and the instruction may be executed by the processor 920 of the device 900 to complete the method. For example, the non-transitory computer-readable storage medium may be an ROM, a random access memory (RAM), a CD-ROM, a magnetic tape, a floppy disc, an optical data storage device and the like.

Other embodiments of the disclosure will be apparent to those skilled in the art from consideration of the specification and practice of the disclosure disclosed here. This application is intended to cover any variations, uses, or adaptations of the embodiments of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the embodiments of the disclosure are not limited to the exact construction that has been described above and illustrated in the accompanying drawings, and that various modifications and changes may be made without departing from the scope thereof. It is intended that the scope of the embodiments of the disclosure only be limited by the appended claims.

What is claimed is:

1. A method for data transmission, comprising:
    generating a first physical layer protocol data frame, wherein the first physical layer protocol data frame comprises a first identification bit and a second identification bit, the first identification bit is configured to identify whether the first physical layer protocol data frame is a retry data frame, and the second identification bit is configured to identify a number of retries of the first physical layer protocol data frame, wherein the second identification bit comprises at least one bit in a physical frame header of the first physical layer protocol data frame; and
    sending the first physical layer protocol data frame.

2. The method of claim 1, wherein the first physical layer protocol data frame further comprises a third identification bit, and the third identification bit is configured to identify a first Modulation and Coding Scheme (MCS) adopted by the first physical layer protocol data frame.

3. The method of claim 2, wherein
    the third identification bit comprises at least one bit in the physical frame header of the first physical layer protocol data frame.

4. The method of claim 3, wherein
    the at least one bit of the third identification bit is located in a signal domain of the physical frame header of the first physical layer protocol data frame.

5. The method of claim 2, wherein
    in response to determining that the number of retries reaches a preset retry threshold, the third identification bit is configured to identify a second MCS adopted by the first physical layer protocol data frame.

6. The method of claim 5, wherein a rate corresponding to the second MCS is lower than a rate corresponding to the first MCS.

7. The method of claim 5, further comprising:
    generating a second physical layer protocol data frame, wherein the second physical layer protocol data frame comprises a fourth identification bit, and the fourth identification bit is configured to identify an MCS of the first physical layer protocol data frame that is successfully received and adopted by the second physical layer protocol data frame.

8. The method of claim 5, wherein
    in response to determining that the number of retries reaches the preset retry threshold and an actual error parameter of the first physical layer protocol data frame generated by adopting the first MCS exceeds a preset error parameter, the third identification bit is configured to identify the second MCS adopted by the first physical layer protocol data frame.

9. The method of claim 8, further comprising:
    determining a preset retry threshold of the first physical layer protocol data frame according to a data type of the first physical layer protocol data frame;
    determining a preset error parameter of the first physical layer protocol data frame according to the data type of the first physical layer protocol data frame; or
    determining the preset retry threshold of the first physical layer protocol data frame according to the data type of the first physical layer protocol data frame and determining the preset retry threshold of the first physical layer protocol data frame according to the data type of the first physical layer protocol data frame.

10. The method of claim 9, wherein
    data types corresponding to different User Priorities (UPs) are different.

11. The method of claim 8, wherein the actual error parameter of the first physical layer protocol data frame generated by adopting the first MCS exceeds the preset error parameter comprises:
    a Packet Error Rate (PER) of the first physical layer protocol data frame generated by adopting the first MCS exceeds a preset PER threshold.

12. The method of claim 8, wherein the actual error parameter of the first physical layer protocol data frame generated by adopting the first MCS exceeds the preset error parameter comprises:
a Bit Error Rate (BER) of the first physical layer protocol data frame generated by adopting the first MCS exceeds a preset BER threshold.

13. The method of claim 1, wherein
the at least one bit of the second identification bit is located in a signal domain of the physical frame header of the first physical layer protocol data frame.

14. A device for data transmission, comprising a processor and a non-transitory storage coupled to the processor, wherein a plurality of programs stored in the non-transitory storage, when executed by the processor, cause the device to:
generate a first physical layer protocol data frame, wherein the first physical layer protocol data frame comprises a first identification bit and a second identification bit, the first identification bit is configured to identify whether the first physical layer protocol data frame is a retry data frame, and the second identification bit is configured to identify a number of retries of the first physical layer protocol data frame, wherein the second identification bit comprises at least one bit in a physical frame header of the first physical layer protocol data frame; and
transmit the first physical layer protocol data frame.

15. The device of claim 14, wherein the first physical layer protocol data frame further comprises a third identification bit, and the third identification bit is configured to identify a first Modulation and Coding Scheme (MCS) adopted by the first physical layer protocol data frame.

16. The device of claim 15, wherein
the third identification bit comprises at least one bit in the physical frame header of the first physical layer protocol data frame.

17. The device of claim 16, wherein
the at least one bit of the third identification bit is located in a signal domain of the physical frame header of the first physical layer protocol data frame.

18. The device of claim 15, wherein
in response to determining that the number of retries reaches a preset retry threshold, the third identification bit is configured to identify a second MCS adopted by the first physical layer protocol data frame.

19. The device of claim 14, wherein
the at least one bit of the second identification bit is located in a signal domain of the physical frame header of the first physical layer protocol data frame.

20. A non-transitory computer-readable storage medium having stored thereon an executable program that, when executed by a processor, implements operations of a method for data transmission, wherein the method comprising:
generating a first physical layer protocol data frame, wherein the first physical layer protocol data frame comprises a first identification bit and a second identification bit, the first identification bit is configured to identify whether the first physical layer protocol data frame is a retry data frame, and the second identification bit is configured to identify a number of retries of the first physical layer protocol data frame, wherein the second identification bit comprises at least one bit in a physical frame header of the first physical layer protocol data frame; and
sending the first physical layer protocol data frame.

* * * * *